(12) United States Patent
Korcz et al.

(10) Patent No.: US 10,003,181 B2
(45) Date of Patent: Jun. 19, 2018

(54) MODULAR COVER PLATES

(71) Applicant: Hubbell Incorporated, Shelton, CT (US)

(72) Inventors: Krzysztof Korcz, Shelton, CT (US); Steven Johnson, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days. days.

(21) Appl. No.: 15/419,383

(22) Filed: Jan. 30, 2017

(65) Prior Publication Data

US 2017/0222415 A1    Aug. 3, 2017

Related U.S. Application Data

(60) Provisional application No. 62/288,483, filed on Jan. 29, 2016.

(51) Int. Cl.
*H02G 3/08* (2006.01)
*H02G 3/14* (2006.01)

(52) U.S. Cl.
CPC ............... *H02G 3/083* (2013.01); *H02G 3/14* (2013.01)

(58) Field of Classification Search
CPC ................................. H02G 3/083; H02G 3/14
USPC ....................................................... 174/66, 67
See application file for complete search history.

(56) References Cited

U.S. PATENT DOCUMENTS

| | | | | |
|---|---|---|---|---|
| 2,980,283 A * | 4/1961 | Bentsen | ................... | H02G 3/14 220/241 |
| 6,679,381 B1 * | 1/2004 | Bush | ................... | B65D 43/164 206/531 |
| 7,211,727 B2 * | 5/2007 | Pearse | ................... | H01R 13/745 174/481 |
| 7,939,756 B2 * | 5/2011 | Daniels | ................... | H02G 3/14 174/66 |
| 8,350,154 B1 * | 1/2013 | Shotey | ................... | H02G 3/14 174/57 |

* cited by examiner

*Primary Examiner* — Dhirubhai R Patel
(74) *Attorney, Agent, or Firm* — Dilworth IP LLC (57) ABSTRACT

Modular electrical box cover plate assemblies are provided. The modular electrical box cover plate assemblies include modular plates that releasably attach to a frame. The modular plates include one or more latch assemblies that provide a snap-fit attachment to the frame.

12 Claims, 11 Drawing Sheets

MODULAR COVER PLATES

BACKGROUND

Field

The present disclosure relates generally to electrical box cover plate assemblies, and more particularly to modular electrical box cover plate assemblies wherein modular cover plates fit within a base frame.

Description of the Related Art

Electrical box cover plates (also called wall plates) are used to cover electrical devices mounted in electrical boxes. Electrical box cover plates provide a decorative cover while preventing access to the interior of the electrical box. Generally, electrical box cover plates are made in predetermined sizes to match the number of electrical boxes the electrical box cover plate is to cover. For example, the electrical boxes may be single gang boxes, two gang boxes, three gang boxes, four gang boxes, and other multiple gang boxes, and the electrical box cover plate would be for single gang boxes, two gang boxes, three gang boxes, four gang boxes, and other multiple gang boxes.

Wall plates typically have openings or apertures configured to permit the user portion of the electrical device to be accessible. Such openings include an aperture for a rocker-type switch, an aperture for a toggle-type switch, an aperture for a round single receptacle, and an aperture or apertures for a duplex receptacle. The electrical box cover plates may also be blank. There are also composite electrical box cover plates where, for example, there is one toggle-type switch aperture and one-half of a duplex receptacle aperture.

Since existing wall plates are fabricated to fit specific box/device combinations, manufacturers have to fabricate and distribute many versions of wall plates. Further, electrical contractors and other tradesman when estimating a job typically perform a "take off" which is a process that includes creating a list of electrical rough-in components, e.g., the type and quantity of boxes, the types and number of switches, the type and number of receptacles, the type and lengths of wire, and the type and number of wall plates, needed to accurately estimate and complete a job. Further, after the components, including the wall plates are purchased, the installer still has to take time to determine where each wall plate purchased should be installed.

Having a modular wall plate, where a limited number of base frames are used with an assortment of interchangeable modular covers would save time and reduce costs.

SUMMARY

The present disclosure provides descriptions of configurations for modular electrical cover plate assemblies. In one exemplary configuration, the modular electrical cover plate assembly comprises a frame and one or more modular plates. The frame has a top wall, a bottom wall, and first and second side walls that define an opening. The frame may also include one or more plate walls positioned within the opening, each plate wall having one end attached to the top wall and another end attached to the bottom wall. Each plate wall at least partially defines a compartment within the opening for receiving a modular plate. Each modular plate has at least one hinge arm and at least one latch assembly used to releasable attach the modular plate to the frame. Each modular plate may also include at least one mounting aperture.

In another exemplary configuration of the modular electrical cover plate assembly according to the present disclosure, the frame has a top wall, a bottom wall, and first and second side walls that define an opening. The frame may also include one or more plate walls positioned within the opening, each plate wall having one end attached to the top wall and another end attached to the bottom wall. Each plate wall at least partially defines a compartment within the opening for receiving a modular plate. Each modular plate has at least one hinge arm and at least one latch assembly used to releasable attach the modular plate to the frame. In this configuration, each compartment has at least two recessed side walls, wherein one side wall has at least one slot for receiving the at least one hinge arm, and the other side wall has at least one slot for receiving the at least one latch assembly.

BRIEF DESCRIPTION OF THE DRAWINGS

The figures depict configurations for purposes of illustration only. One skilled in the art will readily recognize from the following description that alternative configurations of the structures illustrated herein may be employed without departing from the principles described herein, wherein.

DETAILED DESCRIPTION

Figure 1:
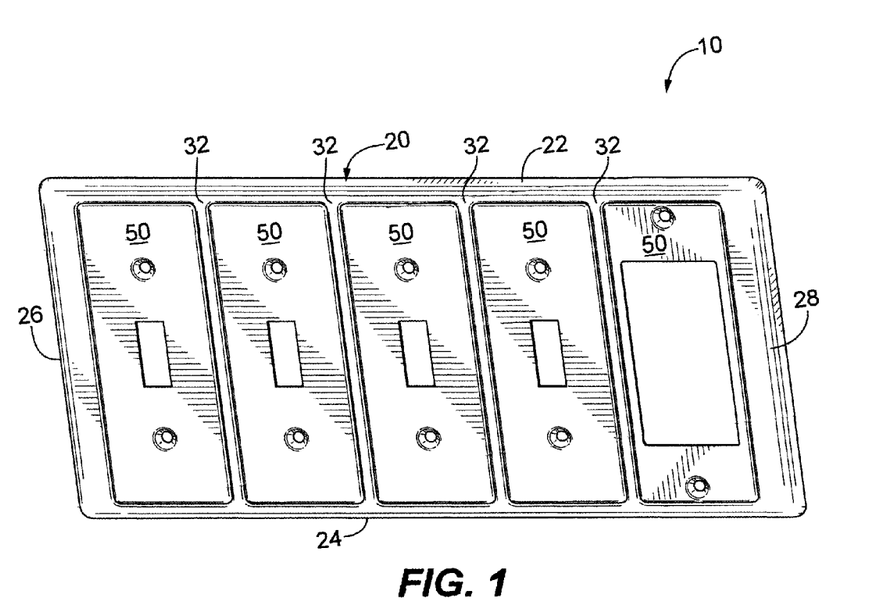
FIG. 1 is a perspective view of an exemplary configuration of a modular cover plate assembly according to the present disclosure having a frame and a plurality of modular plates.
Figure 2:
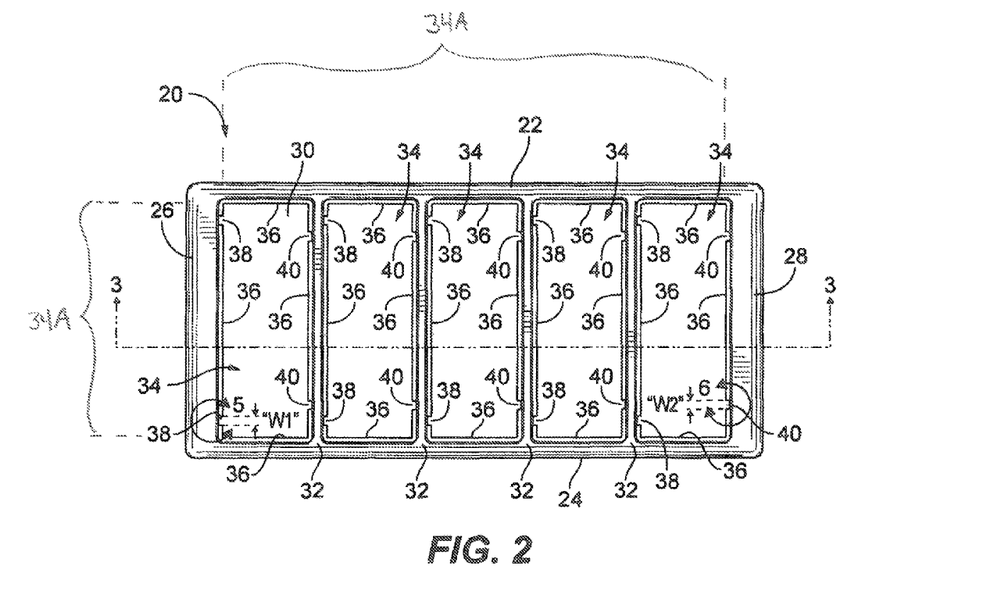
FIG. 2 is a front plan view of an exemplary configuration of the frame according to the present disclosure.
Figure 3:
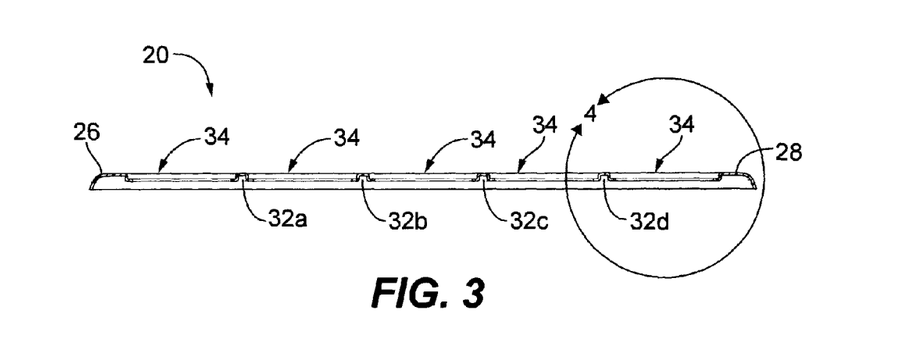
FIG. 3 is a cross-sectional view of the frame of FIG. 2 taken along line 3-3.
Figure 4:
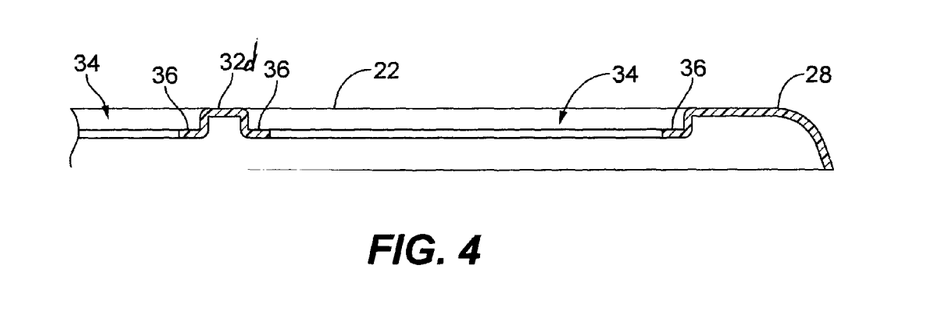
FIG. 4 is an enlarged view of a portion of the frame of FIG. 3 taken from detail 4.

The present disclosure provides descriptions of configurations for modular cover plate assemblies. Referring to FIG. 1, in one exemplary configuration, the modular cover plate assembly 10 (also referred to herein as the "cover plate assembly") includes a frame 20 and one or more modular plates 50. As shown in FIGS. 2-4, the frame 20 has a top wall 22, a bottom wall 24, a left side wall 26 and a right side wall 28 that define an interior opening 34A. The frame may also include one or more plate walls 32. The plate walls 32 are used to divide the interior opening of the frame 20 into compartments 34 that fit the one or more modular plates 50. The plate walls 32 are secured to or integrally formed into the top and bottom walls 22 and 24 of the frame 20, as shown. In the configuration shown in FIGS. 2-4, four plate walls 32 divide the interior opening into five compartments 34. As shown in FIGS. 3 and 4, the compartment 34 adjacent the side wall 26 is defined by a portion of the top wall 22, a portion of the bottom wall 24, a portion of the side wall 26 and a plate wall 32a. Similarly, the compartment 34 adjacent the side wall 28 is defined by a portion of the top wall 22, a portion of the bottom wall 24, a portion of the side wall 28 and a plate wall 32d. The compartments 34 between the end compartments are defined by a portion of the top wall 22, a portion of the bottom wall 24, and two plate walls 32, e.g., plate walls 32a and 32b, or plate walls 32b and 32c, or plate walls 32c and 32d. In an exemplary configuration, the compartments 34 provide a recess from a face surface of each of the top wall 22, the bottom wall 24, and the left and right side walls 26 and 28, as shown in FIG. 4. The recess in each compartment is formed by a recess wall 36 on each of the side walls 26 and 28, the top wall 22, the bottom wall 24, and/or the plate walls 32. The recess wall 36 is configured and dimensioned to receive and support the modular plate 50 such that a face 52 of the modular plate 50 is substantially even (or flush) with a face surface of each of the top wall 22, the bottom wall 24, the left and right side walls 26 and 28, and the plate walls 32.

Figure 5:
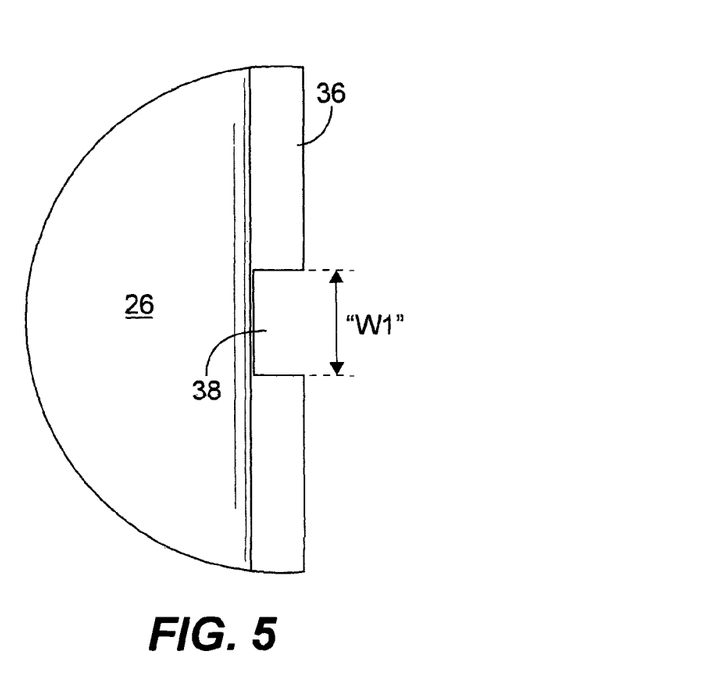
FIG. 5 is an enlarged view of a portion of the frame of FIG. 2 taken from detail 5.
Figure 6:
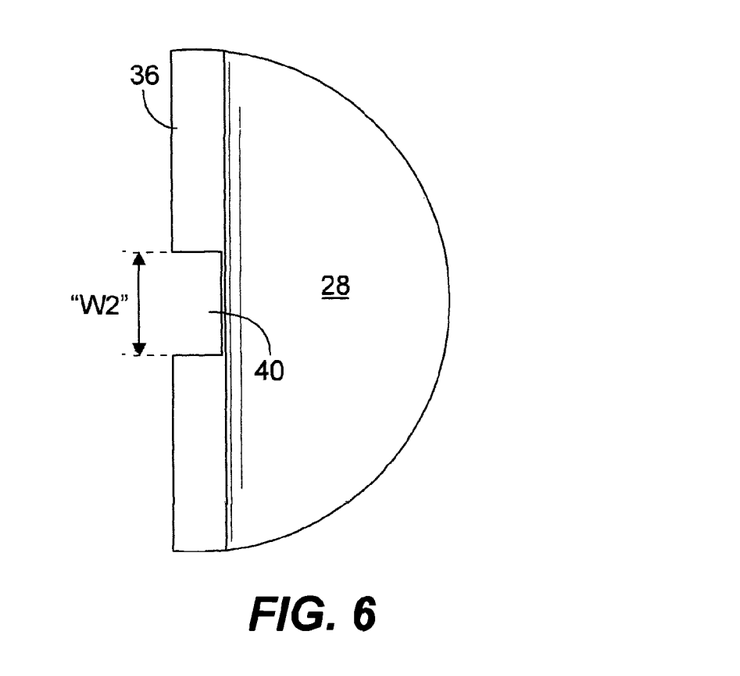
FIG. 6 is an enlarged view of a portion of the frame of FIG. 2 taken from detail 6.

Referring again to FIG. 2, in this exemplary configuration, each recess wall 36 in the side walls 26 and 28, and the plate walls 32 have 2 sets of slots 38 and 40 used to secure the modular plates 50 to the frame 20. In the embodiment shown in FIG. 2, the slots 38 are spread apart further than slots 40. This difference in spacing acts as a key so that each modular plate is installed the same way. However, one skilled in the art can readily appreciate that the slots can be in many positions in order to secure the modular plates to the frame. As seen in FIG. 5, the slots 38 have a width "W1" which may be in the range from about 2.5 mm to about 7 mm. As seen in FIG. 6, the slots 40 have a width "W2" which may be in the range from about 2.5 mm to about 7 mm. The width of the slots 38 and 40 may be the same or they may differ. A difference in width of the slots 38 and 40, may also act as a key to ensure each modular plate 50 is oriented the same way in the frame 20.

Figure 7:
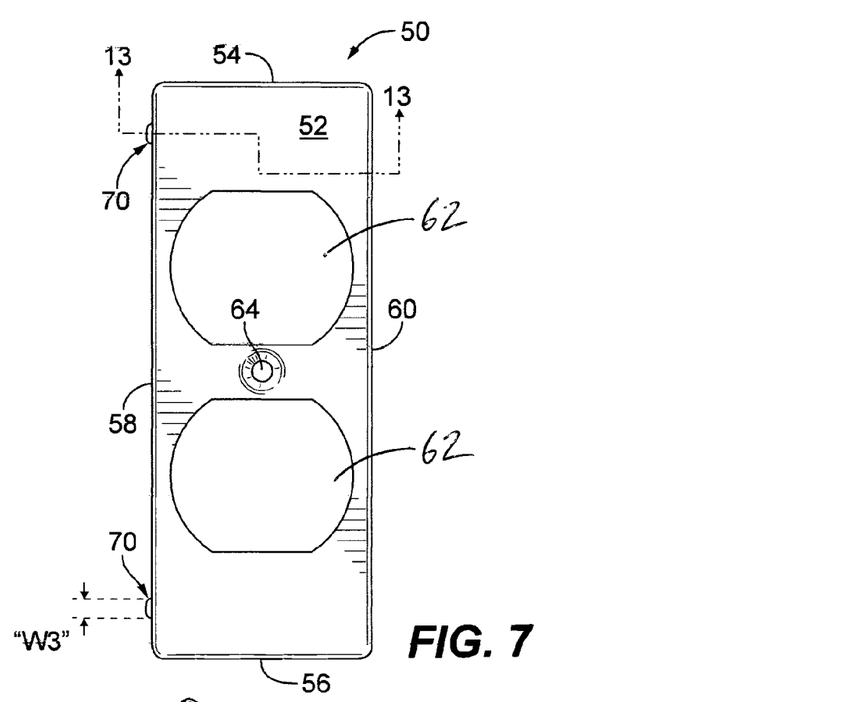
FIG. 7 is a front plan view of an exemplary configuration of the modular plate of FIG. 1.
Figure 8:
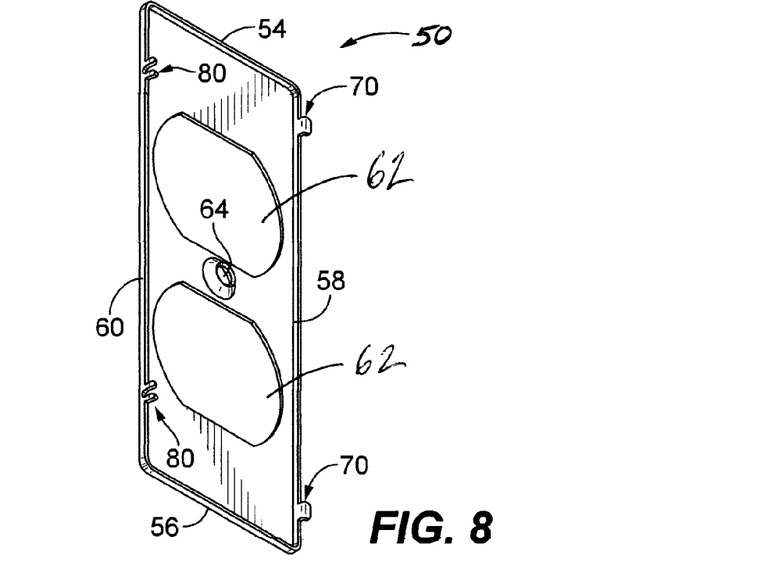
FIG. 8 is a rear perspective view of the modular plate of FIG. 7.

Referring now to FIGS. 7 and 8, an exemplary configuration of a modular plate 50 according to the present disclosure is shown. In this exemplary configuration, the modular plates 50 have a face 52 secured to a top wall 54, a bottom wall 56, a left side wall 58 and a right side wall 60.

Figure 9:
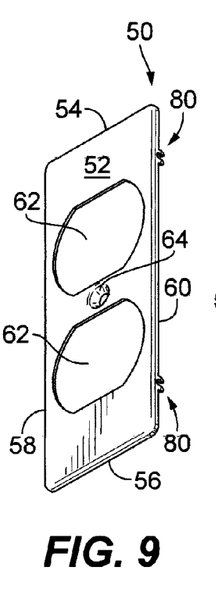
FIG. 9 is a perspective view of an exemplary configuration of a modular plate according to the present disclosure.
Figure 10:
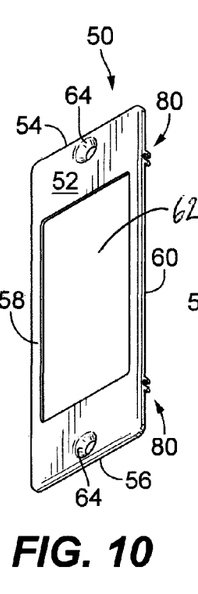
FIG. 10 is a perspective view of another exemplary configuration of a modular plate according to the present disclosure.
Figures 11, 12:
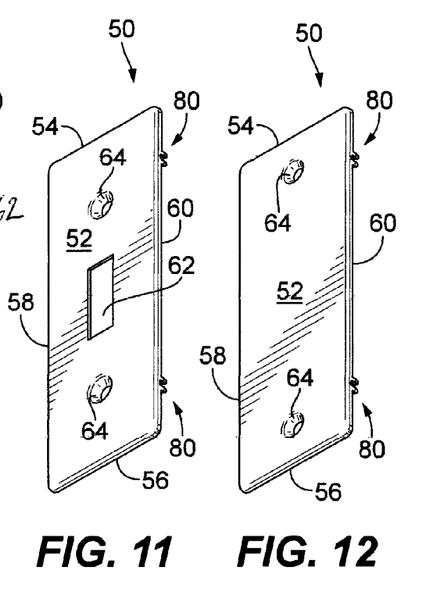
FIG. 11 is a perspective view of another exemplary configuration of a modular plate according to the present disclosure.
FIG. 12 is a perspective view of another exemplary configuration of a modular plate according to the present disclosure.

The face 52 can include one or more openings 62 for receiving portions or parts of electrical devices, and one or more mounting apertures 64 for securing the modular plate 50 to the electrical device. The mounting apertures 64 may be recessed type openings so that the top surface of the fastener, e.g., a 6/32 machine screw, may be flush with the face 52 of the modular plate 50. The one or more mounting apertures 64 are positioned on the face 52 in predefined locations to align with mounting holes in the respective electrical device the modular plate 50 is to cover. For example, as shown in FIG. 9, the modular plate 50 is for a duplex receptacle and includes two openings 62 for the outlet portion of the electrical receptacle to pass through so that the outlets are accessible. In the configuration of FIG. 9, the modular plate 50 has one recessed mounting aperture 64. As shown in FIG. 10, the modular plate 50 is for a décor type electrical device, such as a receptacle or a switch, and includes one opening 62 for a portion of the electrical device to pass through so that it is accessible. In the configuration of FIG. 10, the modular plate 50 has two recessed mounting apertures 64. As shown in FIG. 11, the modular plate 50 is for a switch and includes one opening 62 for the toggle portion of the switch to pass through so that it is accessible. In the configuration of FIG. 11, the modular plate 50 has two recessed mounting apertures 64. As shown in FIG. 12, the modular plate 50 is a blank plate with no opening 62. In the configuration of FIG. 12, the modular plate 50 has two recessed mounting apertures 64.

The modular plates 50 are releasable attached to the frame 20 so that the modular plates can be easily changed depending upon the electrical device the modular plate is to cover. The frame 20 and modular plates 50 us a latching system to releasably attach the modular plate to the frame. In one exemplary configuration, the modular plates 50 are releasable attached to the frame using a hinge and a latch assembly. To attach the modular plate 50 to the frame 20, the modular frame 50 include one or more hinge arms 70 and one or more latch assemblies 80. Each hinge arm 70 interacts with one of the slots 38 or 40, and each latch assembly 80 interacts with one of the slots 40 or 38.

Figure 13:
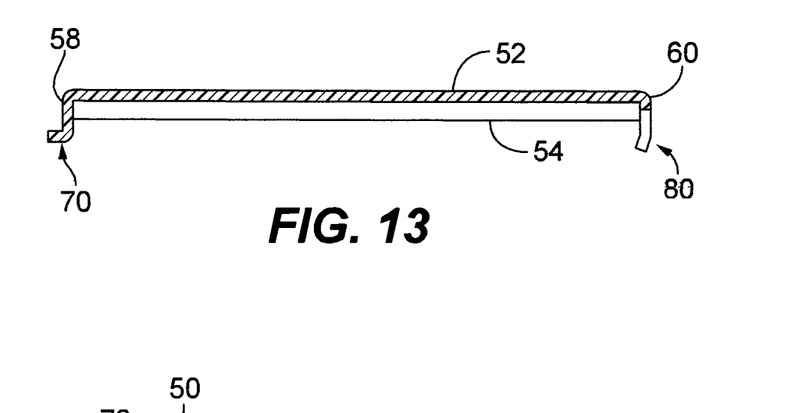
FIG. 13 is a cross-sectional view of the modular plate of FIG. 7 taken along line 13-13.

In one exemplary configuration, seen in FIG. 13, the hinge arm 70 is an "L" shaped member extending from one side, e.g., the left side 58, of the modular plate 50. If the hinge arm 70 is located on the left side 58 of the modular plate 50, the hinge arm 70 should have a width "W3" which is less than the width "W1" of slot 38 in the side wall 26 or the plate wall 32. If the hinge arm 70 is located on the right side 60 of the modular plate 50, the hinge arm 70 should have a width "W3" which is less than the width "W2" of slot 40 in the side wall 28 or the plate wall 32. In the configuration shown in FIGS. 5 and 6, the slots 38 and 40 have different widths. However, as noted above, the width "W1" of slot 38 and the width "W2" of slot 40 may be the same or they may be different. In the configurations shown in FIGS. 9-12, there are two hinge arms 70 extending from the left side 58 of the modular plate 50. However, one skilled in the art can readily appreciate that there may be one hinge arm 70, or that there may be more than two hinge arms 70 to releasably attach the modular plate 50 to the frame 20.

Figure 14:
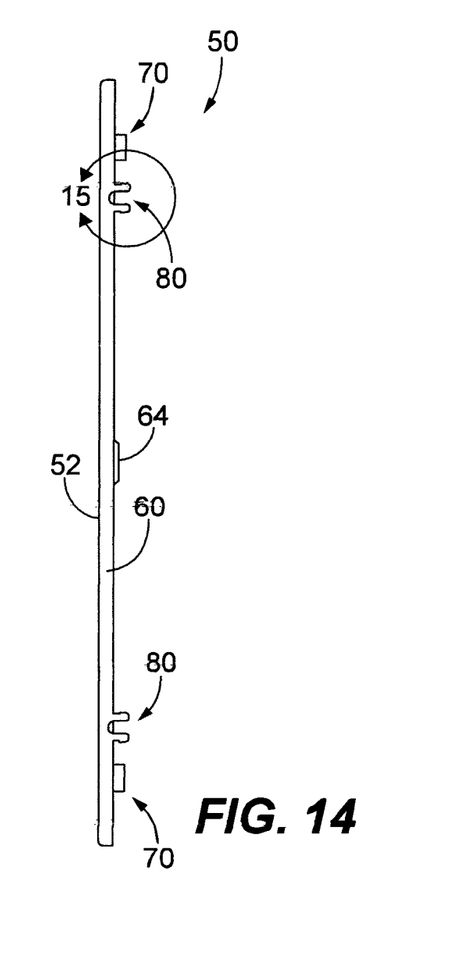
FIG. 14 is a side elevation view of the modular plate of FIG. 7.
Figure 15:
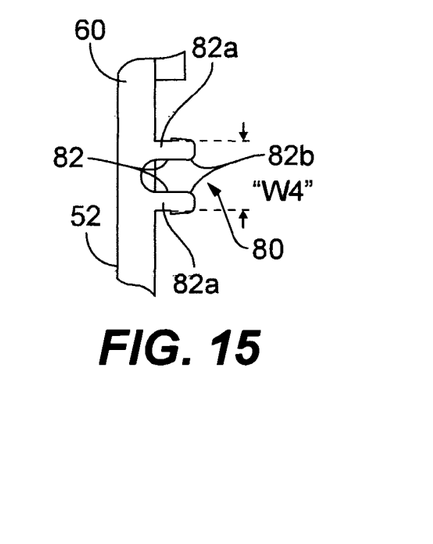
FIG. 15 is an enlarged view of a portion of the modular plate of FIG. 14 taken from detail 15.
Figure 16:
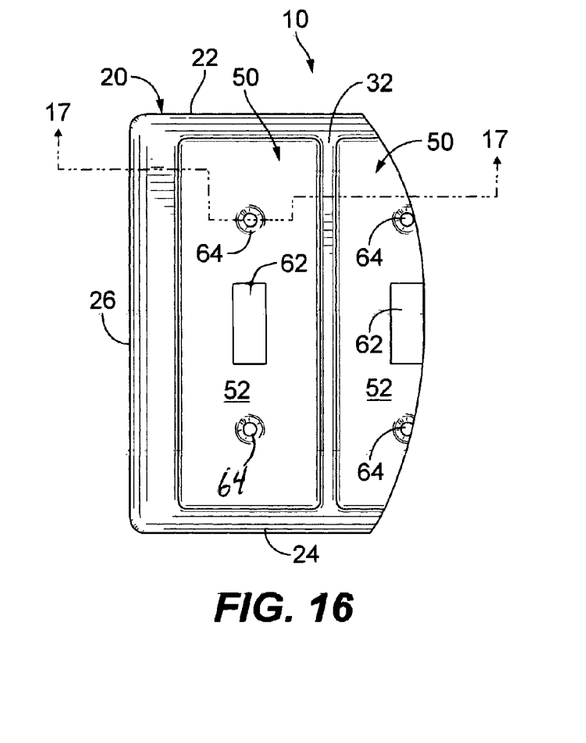
FIG. 16 is front plan view of a portion of the modular cover plate assembly of FIG. 1.
Figure 19:
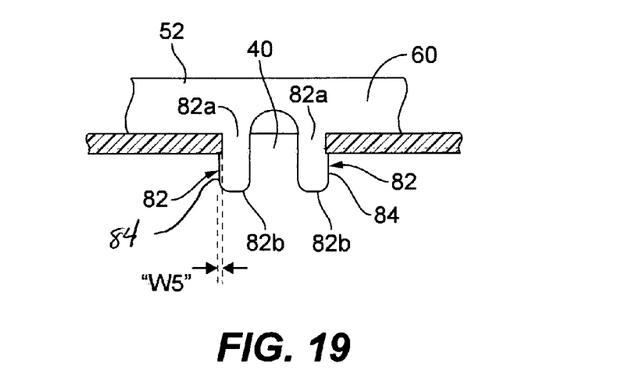
FIG. 19 is a partial cross-sectional view of the modular cover plate assembly of FIG. 18 taken along line 19-19.

In one exemplary configuration, seen in FIGS. 14 and 15, each latch assembly 80 comprises two cantilevered beams 82 having a fixed end 82a extending from the one side, e.g., the right side 60, of the modular plate 50, and a free end 82b, which form of a "U" shaped like member, as seen in FIG. 15. The width "W4" between the outside edges of the fixed ends 82a of the beams 82 may be in the range from about 2.5 mm to about 7 mm. The width "W4" between outside edges of the fixed ends 82b of the beams 82 should be substantially equal to the width of the recess 38 or 40 in the recess walls 36. The free end 82b of the beams 82 include an overhang 84. The overhang 84 increases the width between the free ends 82a of the beams 82 to provide a snap-fit connection. For example, the width "W5" (seen in FIG. 19) between the outside edge of the fixed end 82a of the beam 82 and the overhang 84 may be in the range from about 0.2 mm to about 0.8 mm. This configuration of the latch assembly 80 allows the beams 82 to flex toward each other while passing through the recess 38 or 40 in the recess walls 36, and to return (e.g., snap back) to their normal width (e.g., "W4") after the overhang 84 passes through the recess 38 or 40.

The latch assemblies 80 are typically located on a side of the modular plate 50 opposite the side of the modular plate having the hinge arms 70. Thus, if the hinge arms 70 are located on the left side 58 of the modular plate 50, the latch assemblies 80 should be located on the right side 60 of the modular plate 50. Similarly, if the hinge arms 70 are located on the right side 60 of the modular plate 50, the latch assemblies 80 should be located on the left side 58 of the modular plate 50. With the latch assemblies 80 on the right side of the modular plate 50, the width "W4" between the fixed ends 82a of the beams 82 should be substantially equal to the width "W2" of slot 40 in the corresponding recess wall 36. With the latch assemblies 80 located on the left side of the modular plate 50, the width "W4" between the fixed ends 82a of the beams 82 should be substantially equal to the width "W1" of slot 38 in the corresponding recess wall 36. As previously noted, the width "W1" of slot 38 and the width "W2" of slot 40 may be the same or they may be different. In the configurations shown in FIGS. 9-12, there are two latch assemblies 80 extending from the right side 58 of the modular plate 50. However, one skilled in the art can readily appreciate that there may be one latch assembly 80, or that there may be more than two latch assemblies 80 to facilitate releasably attaching the modular plate 50 to the frame 20.

Figure 17:
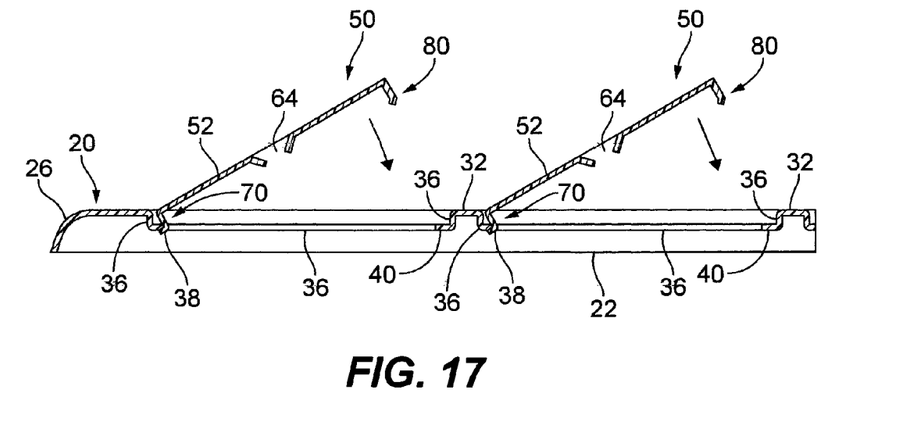
FIG. 17 is a partial cross-sectional view of the modular cover plate assembly of FIG. 16 taken along line 17-17 illustrating modular plates being attached to the frame.
Figure 18:
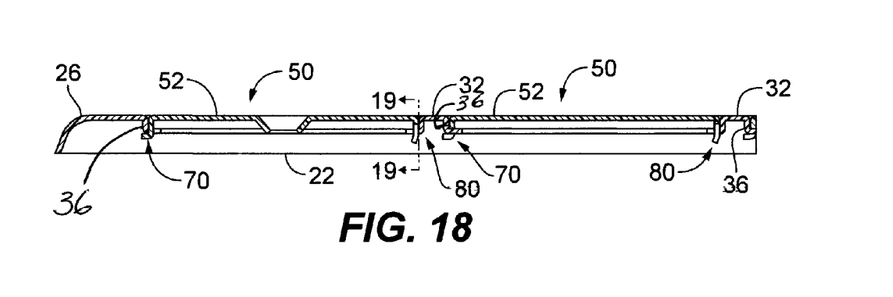
FIG. 18 is a partial cross-sectional view of the modular cover plate assembly of FIG. 16 taken along line 17-17 illustrating modular plates attached to the frame.

Referring now to FIGS. 16-19, insertion and attachment of modular plates 50 to frame 20 will be described. Initially, as seen in FIG. 17, the modular plates 50 are angled so that hinge arm 70 can be inserted into slots 38 in the recess walls 36, which together provide a hinge like function, in the particular compartment 34 in which the modular plate is being attached. The modular plates 50 are then pivoted toward the frame 20, as shown by the arrow in FIG. 17, until the latch assemblies 80 meet the recesses 40 in the recess walls 36. Additional force may be applied to the modular plate 50 so that the beams 82 of the latch assemblies 80 flex toward each other while passing through the recess 40 in the recess walls 36. When the overhang 84 of the latch assemblies 80 pass through the recess 40, the beams 82 return, or snap back, to their normal width (e.g., "W4") thus attaching the modular plate 50 to the frame 20.

Figure 20:
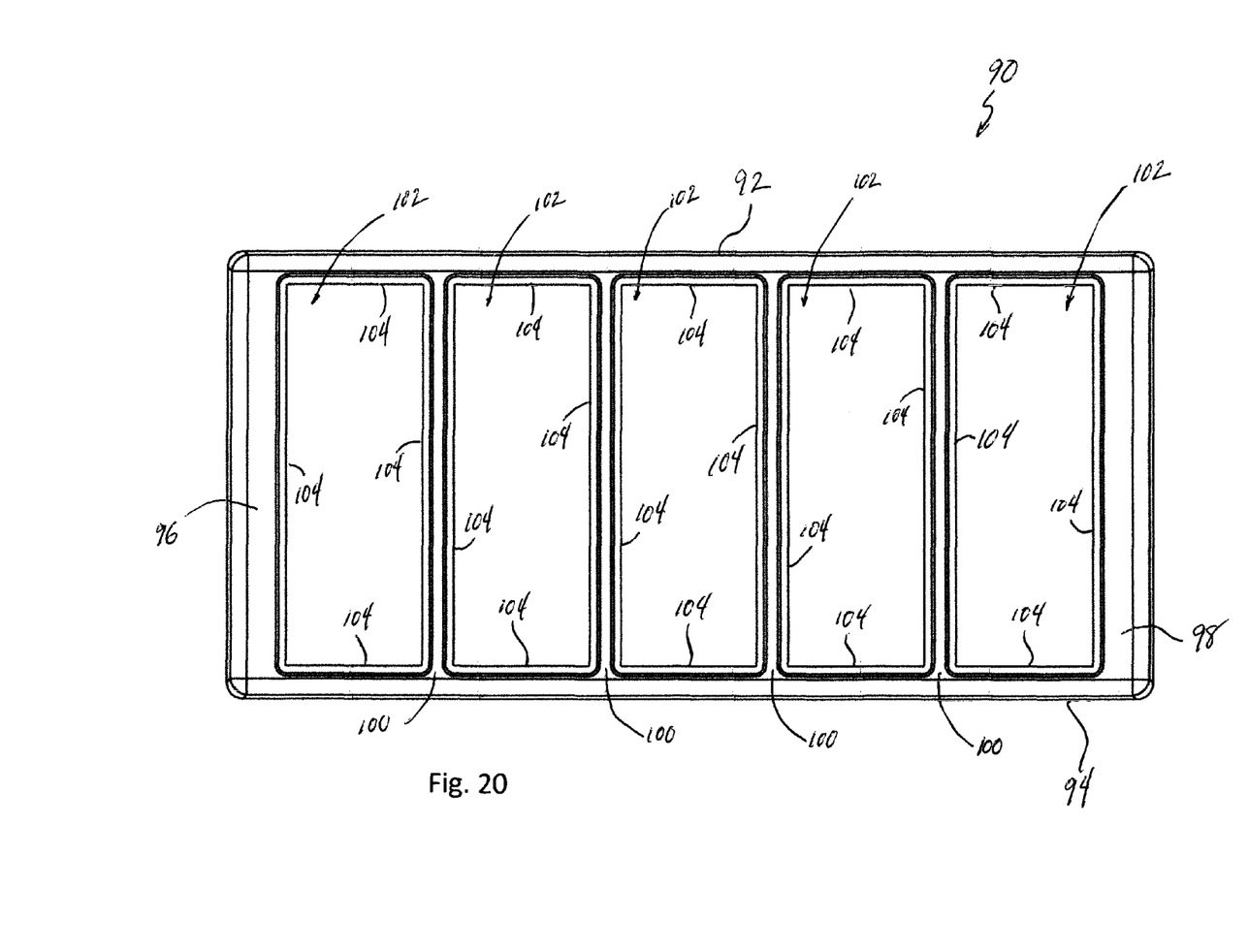
FIG. 20 is a front plan view of another exemplary configuration of the frame according to the present disclosure.
Figure 21:
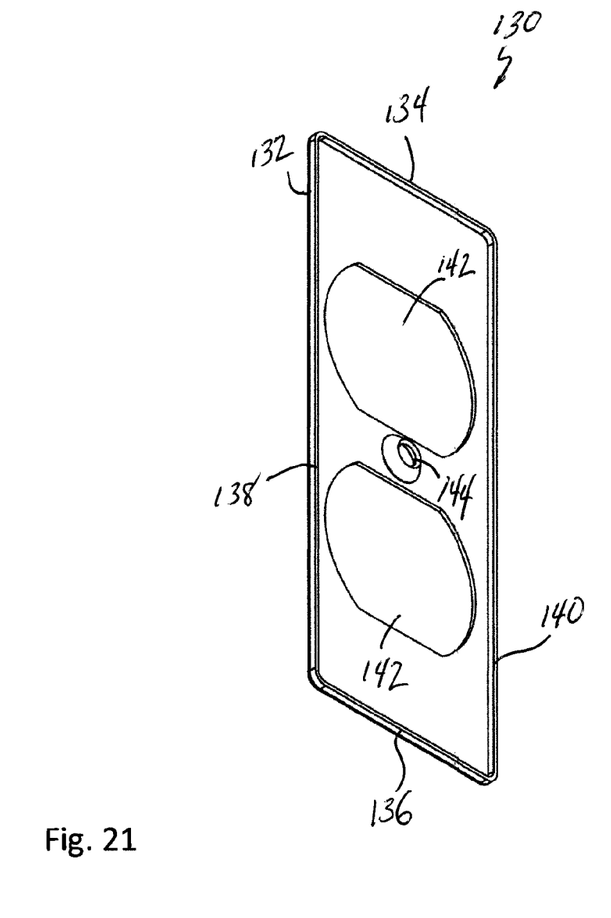
FIG. 21 is a rear perspective view of another exemplary configuration of the modular plate of the present disclosure.

Referring to FIGS. 20 and 21, another exemplary configuration of the frame of the present disclosure is shown. In this exemplary embodiment, the frame 90 has a top wall 92, a bottom wall 94, a left side wall 96 and a right side wall 98 that define an interior opening. The frame 90 may also include one or more plate walls 100. The plate walls 100 are used to divide the interior opening of the frame 90 into compartments 102 that receive the one or more modular plates 130. The plate walls 100 are secured to or integrally formed into the top and bottom walls 92 and 94 of the frame 90, as shown. In the configuration shown, four plate walls 100 divide the interior opening into five compartments 102. As shown in FIG. 20, and similar to the configuration described above with regards to FIGS. 2-4, the compartment 102 adjacent the side wall 96 is defined by a portion of the top wall 92, a portion of the bottom wall 94, a portion of the side wall 96 and a plate wall 100. Similarly, the compartment 102 adjacent the side wall 98 is defined by a portion of the top wall 92, a portion of the bottom wall 94, a portion of the side wall 98 and a plate wall 100. The compartments 102 between the end compartments are defined by a portion of the top wall 92, a portion of the bottom wall 94, and two plate walls 100. The compartments 102 provide a recess from a face surface of each of the top wall 92, the bottom wall 94, and the left and right side walls 96 and 98, as described above. The recess in each compartment is formed by a recess wall 104, on each of the side walls 96 and 98, the top wall 92, the bottom wall 94, and/or the plate walls 100. The recess wall 104 is configured and dimensioned to receive and support the modular plate 130 such that a face 132 of the modular plate 130 is substantially even (or flush) with a face surface of each of the top wall 92, the bottom wall 94, the left and right side walls 96 and 98, and the plate walls 100.

Referring to FIG. 21, another exemplary configuration of a modular plate 130 according to the present disclosure is shown. In this exemplary configuration, the modular plates 130 have a face 132 secured to a top wall 134, a bottom wall 136, a left side wall 138 and a right side wall 140. The face 132 can include one or more openings 142 for receiving portions or parts of electrical devices, and one or more mounting apertures 144 for securing the modular plate 130 and the base 90 to the electrical device, as will be described below. The mounting apertures 144 may be recessed type openings so that the top surface of the fastener, e.g., a 6/32 machine screw, may be flush with the face 132 of the modular plate 130. The one or more mounting apertures 144 are positioned on the face 132 in predefined locations to align with mounting holes in the respective electrical device the modular plate 130 is to cover. For example, the modular plate 130 in FIG. 21 is for a duplex receptacle and includes two openings 142 for the outlet portion of the electrical receptacle to pass through so that the outlets are accessible.

To secure the base 90 and modular plate 130 to an electrical box, one or more modular plates configured to fit over one or more electrical devices installed in the electrical box are positioned within a respective compartment 102 so that each wall (walls 134, 136, 138 and 140) of the modular plate 130 rest on a corresponding recess wall 104 in the compartment. The modular plate 130 is then fastened to the electrical device or the electrical box so that the modular plate applies pressure on the base 90 to also secure the base 90 to the wall by a pressure fit.

The cover plate assembly 10 according to the present disclosure can be made of metal, e.g., steel or plated steel, or the cover plate assembly 10 can be made from non-metallic materials, such as plastic. An example of a suitable plastic material is injection molded thermoplastic.

It should also be noted that the present disclosure also contemplate using the latch assemblies described herein on both sides of the modular plate and eliminating the hinge arm. In this configuration, both sides of each modular plate 50 would latch to the frame 20, as described herein.

While illustrative configuration s of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A modular electrical cover plate assembly, comprising:
a frame having a top wall, a bottom wall, and first and second side walls that define an opening, and one or more plate walls positioned within the opening, each plate wall having one end attached to the top wall and another end attached to the bottom wall;
wherein each plate wall at least partially defines a compartment within the opening for receiving a modular plate; and
wherein each modular plate has at least one hinge arm and at least one latch used to releasable attach the modular plate to slots defined in each compartment defined within the frame.

2. The modular electrical cover plate according to claim 1, wherein each modular plate further comprises at least one mounting aperture.

3. The modular electrical cover plate according to claim 1, wherein each modular plate further comprises at least one opening for receiving at least a portion of an electrical device.

4. The modular electrical cover plate according to claim 1, wherein the frame is a two gang frame having two compartments for receiving two modular plates.

5. The modular electrical cover plate according to claim 1, wherein the frame is a three gang frame having three compartments for receiving three modular plates.

6. The modular electrical cover plate according to claim 1, wherein the frame is a four gang frame having four compartments for receiving four modular plates.

7. A modular electrical cover plate assembly, comprising:
a frame having a top wall, a bottom wall, and first and second side walls that define an opening, and one or more plate walls positioned within the opening, each plate wall having one end attached to the top wall and another end attached to the bottom wall;
wherein each plate wall at least partially defines a compartment within the opening for receiving a modular plate;
wherein a modular plate has at least one hinge arm and at least one latch used to releasable attach the modular plate to the frame; and
wherein each compartment has at least two recessed side walls, wherein one side wall has at least one slot for receiving the at least one hinge arm, and the other side wall has at least one slot for receiving the at least one latch.

8. The modular electrical cover plate according to claim 7, wherein each modular plate further comprises at least one mounting aperture.

9. The modular electrical cover plate according to claim 7, wherein each modular plate further comprises at least one opening for receiving at least a portion of an electrical device.

10. The modular electrical cover plate according to claim 7, wherein the frame is a two gang frame having two compartments for receiving two modular plates.

11. The modular electrical cover plate according to claim 7, wherein the frame is a three gang frame having three compartments for receiving three modular plates.

12. The modular electrical cover plate according to claim 7, wherein the frame is a four gang frame having four compartments for receiving four modular plates.

* * * * *